(12) United States Patent
Törnkvist (10) Patent No.: US 9,532,263 B2
(45) Date of Patent: Dec. 27, 2016

(54) METHOD AND APPARATUS FOR CONTROLLING DATA TRANSMISSION IN A COMMUNICATION SYSTEM

(75) Inventor: Robert Törnkvist, Karlshamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 116 days.

(21) Appl. No.: 14/347,379

(22) PCT Filed: Sep. 30, 2011

(86) PCT No.: PCT/SE2011/051167
§ 371 (c)(1),
(2), (4) Date: Mar. 26, 2014

(87) PCT Pub. No.: WO2013/048298
PCT Pub. Date: Apr. 4, 2013

(65) Prior Publication Data
US 2014/0241161 A1    Aug. 28, 2014

(51) Int. Cl.
| | | |
|---|---|---|
| *H04L 12/28* | (2006.01) | |
| *H04L 12/56* | (2006.01) | |
| *H04W 28/02* | (2009.01) | |
| *H04W 24/02* | (2009.01) | |
| *H04W 28/18* | (2009.01) | |

(52) U.S. Cl.
CPC ......... *H04W 28/0268* (2013.01); *H04W 24/02* (2013.01); *H04W 28/18* (2013.01)

(58) Field of Classification Search
CPC ... H04W 28/0268; H04W 28/18; H04W 24/02
(Continued)

(56) References Cited

U.S. PATENT DOCUMENTS 7,991,003 B2 * 8/2011 Hamanaka ............ H04L 1/0006
370/252
2006/0215650 A1 * 9/2006 Wollmershauser . H04L 12/2856
370/389
(Continued)

FOREIGN PATENT DOCUMENTS

WO    2011011790 A2    1/2011

OTHER PUBLICATIONS

Castro, F., et al., "SAPC: Ericsson's convergent policy controller," Ericsson Review. Convergent Policy Control from Concept to Product. Mar. 31, 2010. pp. 1-6.
(Continued)

*Primary Examiner* — Chuong T Ho
(74) *Attorney, Agent, or Firm* — Murphy, Bilak & Homiller, PLLC (57) ABSTRACT

A method and apparatus for controlling data transmission in a communication system is provided. In one aspect of the invention relates to a method performed by a data transmission control node in a communication system. The method comprises receiving a request for a transmission rule for a device; determining a transmission impacting parameter for the device based on information received in the request and based on the transmission impacting parameter further determining a device transmission rule governing the data transmission by the device. A transmission rule deployment message is transmitted to the device enabling the device to govern transmission in accordance with the device transmission rule. Another aspect of the invention relates to a transmission control node apparatus and a further aspect relates to a user equipment device. An advantage is that enabling a sending device to optimize its traffic allows a better performing network with higher utilization.

16 Claims, 5 Drawing Sheets

(58) Field of Classification Search
USPC .................................................. 370/389, 401
See application file for complete search history.

(56) References Cited

U.S. PATENT DOCUMENTS

| | | | |
|---|---|---|---|
| 2008/0222246 A1* | 9/2008 | Ebling | A61B 5/14532 709/203 |
| 2009/0046743 A1* | 2/2009 | Hamanaka | H04L 1/0006 370/498 |
| 2009/0190524 A1* | 7/2009 | Liu | H04W 28/24 370/328 |
| 2010/0027513 A1* | 2/2010 | Ikeda | H04W 16/06 370/337 |
| 2013/0016667 A1* | 1/2013 | Blomqvist | H04M 15/8027 370/329 |
| 2014/0204755 A1* | 7/2014 | Liu | H04W 28/24 370/235 |

OTHER PUBLICATIONS

Third Generation Partnership Project, "3GPP TS 23.203, V11.3.0 (Sep. 2011)," 3rd Generation Partnership Project; Technical Specification Group Services and System Aspects; Policy and charging control architecture (Release 11). Sep. 2011. pp. 1-167.

Third Generation Partnership Project, "3GPP TS 23.203 V10.4.0 (Jun. 2011)," 3rd Generation Partnership Project; Technical Specification Group Services and System Aspects; Policy and charging control architecture (Release 10). Jun. 2011. pp. 1-130.

* cited by examiner

METHOD AND APPARATUS FOR CONTROLLING DATA TRANSMISSION IN A COMMUNICATION SYSTEM

FIELD OF INVENTION

The present invention relates to a method and apparatus for controlling data transmission in a communication system.

BACKGROUND

Operators of communication networks face a challenge in how to secure mobile broadband revenues.

The tremendous uptake in mobile broadband subscribers and data volume will require substantial investments in operators' telecom infrastructure. On the other hand, users will expect their operator to deliver the service experience they have paid for. Thus, operator revenues from mobile broadband rely on satisfied customers.

A small fraction of the users generates traffic exceeding those of normal users with magnitude. In many networks, these heavy users are consuming a quite large part of today's network resources. Experience shows that heavy users normally constitutes of 5-10% of the total subscribers, but could consume 70-85% of the network resources. It has been shown that often the heavy users are the biggest consumers of the network resources also during busy hour.

With policy control operators can distribute the traffic load more evenly, giving a defined Quality of Service QoS, e.g. more bandwidth resources, for the normal users (the majority of the subscribers), particularly during the busy hour. Policy control also enables operators to push the heavy user's traffic into the non-busy hours where number of normal users is lower. For some heavy user applications, time of day is not very critical since they click to download and leave the application running for hours or even days before completing a larger download. Policy control therefore helps controlling network capacity utilization by managing the traffic in a smarter way.

Today and in the future, operators are introducing new premium services, for example ring tones download, TV, video streaming, VoIP, etc. To make sure that the subscribers get the best end user experience while consuming these premium services policy control is used to allocate more bandwidth for these applications when being accessed.

Operators use policy control to move away from a blanket, flat fee for everyone, to the right price for the right service at the right time ensuring users get the user experience paid for. This gives consumers the chance to choose a subscription that best meets their circumstances and decide how to act when the subscription doesn't meet their current, specific needs.

For operators, policy control makes it possible to get the most value from their bandwidth, by leveraging the right price for the right service at the right time.

In order to handle policy control and charging, the 3rd Generation Partnership Project 3GPP has in TS 23.203 V10.4.0 (2011-06) specified a policy and charging control PCC functionality encompassing the two main functions:

Policy control (e.g. gating control, QoS control, QoS signaling, etc.);
Flow Based Charging, including charging control and online credit control.

The PCC functionality is comprised by the functions of the Policy and Charging Enforcement Function PCEF, the Bearer Binding and Event Reporting Function BBERF, the Policy and Charging Rules Function PCRF, the Application Function AF, the Online Charging System OCS, the Offline Charging System OFCS and the Subscription Profile Repository SPR or the User Data Repository UDR.

The PCC architecture extends the architecture of an IP Connectivity Access Network IP-CAN, e.g. GPRS, where the PCEF is a functional entity in the gateway node implementing the IP access to the Packet Data Network PDN.

The PCRF is the part of the network architecture that aggregates information to and from the network supporting the creation of rules and then making policy decisions for subscribers active on the network.

In the mobile networks it is becoming more and more common that also machines as for example electricity meters and car supervision devices are communicating with no or little human interaction. Communication devices in such machines will be more numerous than the devices used for human communication, and even though most of them may not generate a lot of traffic on a per device basis the sheer number of devices in a communication network will generate a lot of traffic. Certain machines, for example surveillance cameras, may also send significant amount of data. Estimates indicate that within a few years the worldwide number of communicating entities may reach 50 billion devices.

Although the use and advantage for society of such massive communication capability as utilized by M2M traffic is ample the value of each single transmission may be considered low. It is therefore essential that available capacity of the communication network is utilized in an efficient manner. A drawback with policy control as specified by 3GPP TS 23.203 is that the policy enforcement provided by the PCEF only serves to limit traffic throughput exceeding that imposed by the policy control rules of the PCRF.

SUMMARY OF INVENTION

An object of the invention is to provide a method and apparatus for controlling data transmission in a communication system mitigating the problem of that policy enforcement provided by the PCEF only serves to limit traffic throughput exceeding that imposed by the policy control rules of the PCRF.

One aspect of the invention relates to a method performed by a data transmission control node in a communication system. The method comprises in receiving a request for a transmission rule for a device; determining a transmission impacting parameter for the device based on information received in the request and based on the transmission impacting parameter further determining a device transmission rule governing the data transmission by the device. A transmission rule deployment message is transmitted to the device enabling the device to govern transmission in accordance with the device transmission rule.

It is an advantage of the invention that the transmission of a transmission rule deployment message to the device enables the device to govern transmission in accordance with the transmission rule thereby enabling the sending device to optimize its traffic since this will allow for a better performing network with higher utilization, and cost effective solutions for the connected devices and subscribers.

Another aspect of the invention relates to a transmission control node apparatus comprising a processor and a memory. The memory is storing instructions that, when executed by the processor, cause the apparatus to receive a request for a transmission rule for a device and to determine a transmission impacting parameter for the device based on information received in the request. Based on the determined transmission impacting parameter the memory further comprises instruction that when executed by the processor cause the apparatus to determine a device transmission rule governing the data transmission by the device and to transmit a transmission rule deployment message to the device enabling the device to govern transmission in accordance with the device transmission rule.

A further aspect of the invention relates to a user equipment device comprising a processor and a memory. The memory is storing instructions that, when executed by the processor, cause the user equipment device to receive a transmission rule deployment message to set a device transmission rule at the user equipment device, to collect data to be transmitted and to check the data for compliance with the device transmission rule. If affirmative the device transmits the data to a server via a connectivity access network.

Embodiments of the invention will now be described in more detail with reference to the enclosed drawings.

DETAILED DESCRIPTION OF THE INVENTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
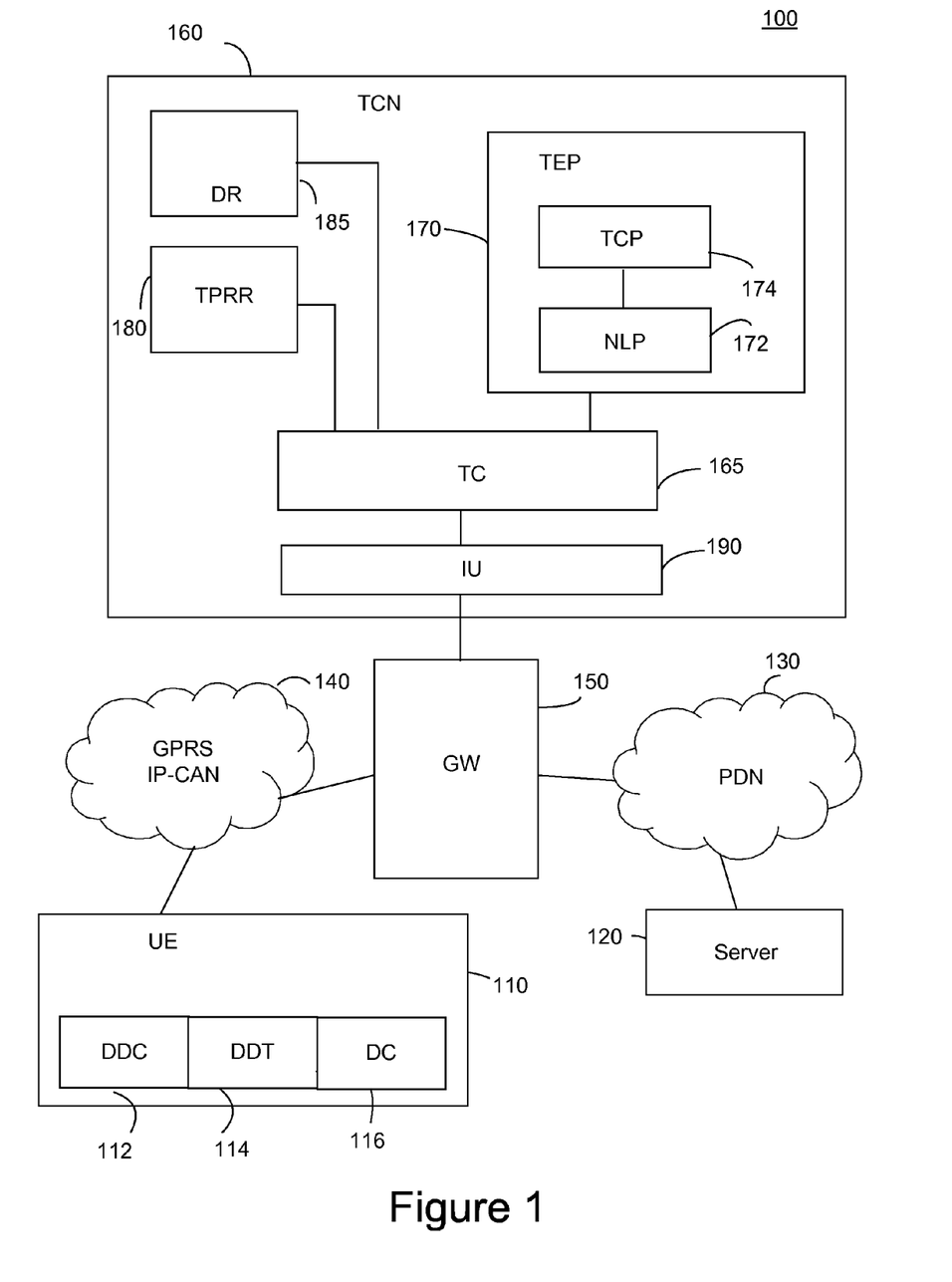
FIG. 1 is a block diagram showing a basic network structure for transmission control in a communication system.

FIG. 1 is a block diagram showing the basic network structure of transmission control node in a communication system.

The communication system 100 may be any type of communication system capable of transmitting data, for example a mobile communication system such as Global System for Mobile communications (GSM), Wideband Code Division Multiple Access (WCDMA), General Packet Radio Service (GPRS), Enhanced Data rates for GSM Evolution (EDGE), High Speed Packet Access (HSPA) or Long Term Evolution (LTE) system. The invention is in particular suitable for usage where machines communicate with each other without continuous human interaction, so called machine-to-machine, or M2M, communication.

FIG. 1 shows a User Equipment (UE) device 110 such as a mobile telephone, a machine-to-machine (M2M) communication device, a personal digital assistant (PDA), personal computer or other type of computer which is provided access to a remote server 120 located at a Packet Data Network PDN 130 via an Internet Protocol (IP) Connectivity Access Network (IP-CAN) 140, e.g. GPRS and a gateway (GW) 150, e.g. a GPRS Gateway Support Node (GGSN).

By way of example, a device for M2M connectivity may be for example a mobile telephone with limited display and keypad functionality but including a Device Data Collector (DDC) component 112 for collecting data to be transmitted for further processing e.g. the metering part in the electricity metering device. The collected data may also include various kinds of sensor data such as temperature, humidity, sound pressure but may also include data received from connected computer devices. The device further includes a Device Data Transmitter (DDT) component 114 enabling access to the IP-CAN using for example GSM/WCDMA/GPRS/EDGE/HSPA or LTE. In an M2M context the UE controls its transmission of data without direct control from a human user, i.e. only indirect usage control like usage of the service the device provides. The Data Transmitter is controlled by a Device Controller (DC) 116 that based on device transmission rules controls when the UE may transmit data. In a similar manner, any type of UE device may be provided with a DC for controlling the transmission by a DDT.

The communication system includes a Transmission Control Node (TCN) 160 for controlling data transmission in the communication system. The transmitted data may use any bearer such as GPRS, Unstructured Supplementary Service Data (USSD) or Short Message Service (SMS).

The TCN includes a Transmission Controller (TC) 165 handling interaction with the UEs for determining and setting rules for when a particular UE is allowed to transmit data. The rules are determined based on input from a Transmission Environment Predictor TEP 170 providing various characterizing transmission impacting parameters of the present as well as forecasted environment in which transmission might occur. Characteristics includes present and forecasted network usage characteristics such as traffic load in various nodes of the communication system 100 provided by a Network Load Predictor (NLP) 172 and cost characteristics such as price data for different types of traffic in different parts of the communication system provided by a Transmission Cost Predictor (TCP) 174.

The NLP 172 makes predictions of the network load. The network load may be location dependent and therefore needs to take into consideration the location of the UEs and the amount of data they will transmit. The network load also depends on other external factors, in addition to the impact of devices controlled by the transmission control, like events such as traffic stockings or football matches that needs to be known by the TC in order to make the correct determinations.

The TCP 174 makes predictions of the cost for the transmission. Since the transmission cost may dependent on the network load, the TCP may interact with the NLP to take this into consideration. The cost prediction provided to the TC by the TCP may be used to influence the transmission control, having for example the UEs to transmit at the lowest possible cost. The TC 165 will control how data will be sent and this will in turn influence the predicted cost, especially if the amount of transmission controlled devices constitutes a significant part of the total traffic in the communication network. The transmission control is therefore an iterative process. The UE may also subscribe to the present cost from the TCN appended as a dynamic part to the device transmission rule transmitted to the UE.

A Transmission Pattern and Rule Repository (TPRR) 180 is provided in the TCN used to store device transmission patterns describing the characteristics of how a device transmits its information to the server or other connected devices. A device transmission pattern is identified by a device transmission pattern name and is described by for example the following parameters:

service; type of service (e.g. voice, data, SMS)
    volume; volume of service that is transmitted each time
    frequency; how often does the device transmit (including how retransmission is handled)
    criticality; how time critical is the transmission
    mobility; how mobile is the device i.e. can the device change location
    QoS; what requirements does the device have on the Quality of Service (QoS) of the transmission (e.g. data speed)

An example of a transmission pattern is: Service=Data, Volume=1 KB per transmission, Frequency=Once per 24 h, Criticality=Minimum 1 transmission per day, Mobility=Fixed, QoS=None.

The TPRR also stores device transmission rules that UEs needs to enforce for when it is allowed to transmit. A device transmission rule is identified by a device transmission rule name and is described by for example the following parameters:

spatial; sets the area boundaries for the transmission
    time; sets absolute time boundaries for the transmission
    service; defines which service the rule is applicable for
    volume; sets a cap on how much data that may be transmitted for the rule
    duration; sets the time window is for how long the transmission can be
    cost; indicates the maximum cost for the transmission expressed in monetary value per byte The device transmission rules may be overridden by a device requiring transmission outside the rule boundaries, depending on for example criticality and for how long time a device can store events.

An example of a rule could be: Allowed transmission: Spatial=CellId1, Time=02:00-03:00, Service=Data, Volume=1 GB.

Further, a Device Repository (DR) 185 is provided in the TCN used to store the present device transmission rules that a specific UE needs to enforce for when it is allowed to transmit as well as the device transmission pattern. Any UE or subscription identity such as International Mobile Subscriber Identity (IMSI), Mobile Subscriber ISDN Number (MSISDN), Session Initiated Protocol—Uniform Resource Locator (SIP-URI), or IP address may be used to associate the UE with a transmission rule and a transmission pattern.

An Interface Unit (IU) 190 is provided in order to receive information about new devices and their transmission patterns via the gateway and to transmit a transmission rule deployment message to the UE via the gateway enabling the UE to govern transmission in accordance with the transmission rule.

Figure 2:
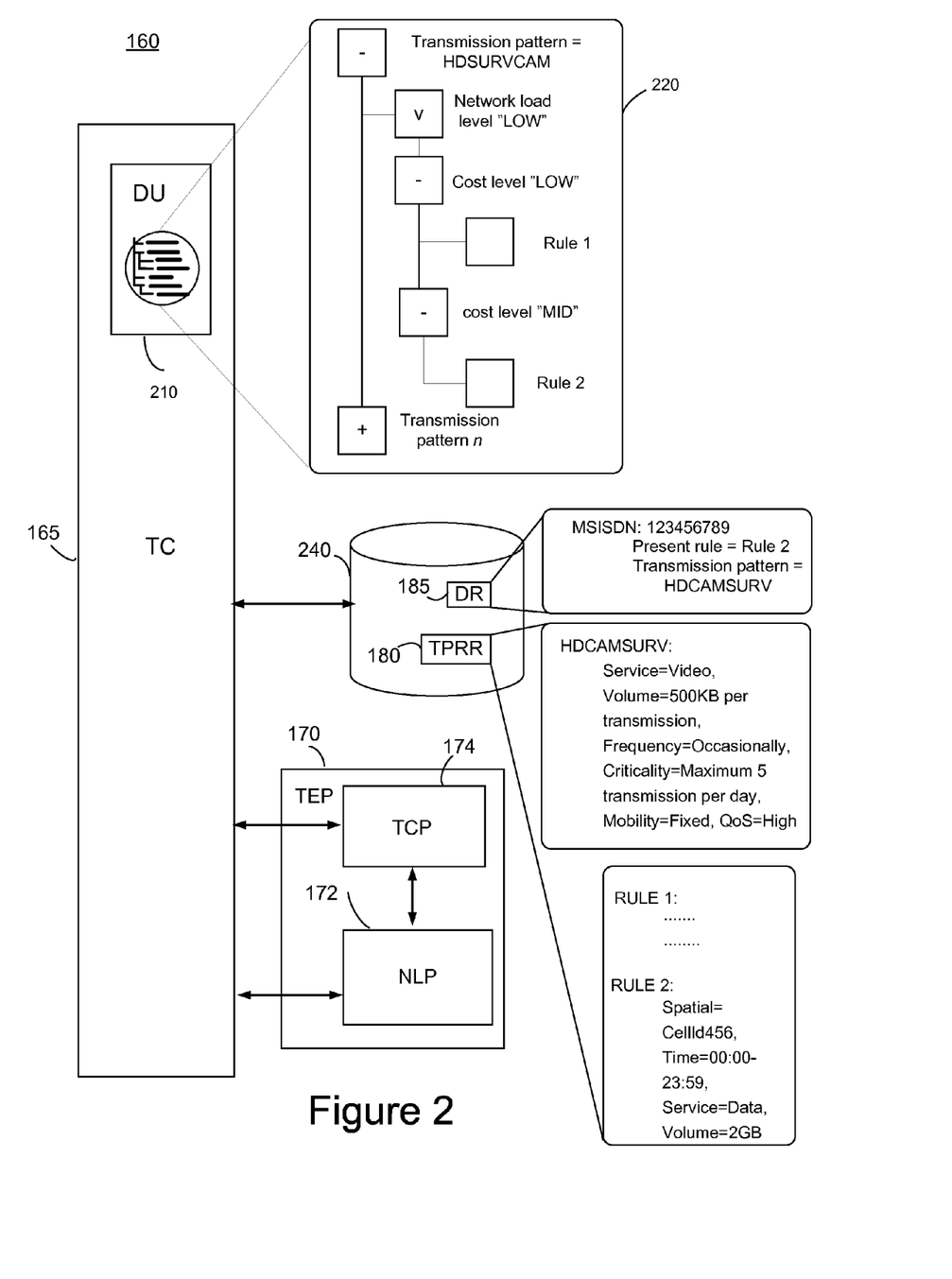
FIG. 2 is a block diagram showing the function blocks of a transmission control node.

FIG. 2 is a block diagram showing the function blocks of a transmission control node.

The transmission control node 160 includes the TC 165 being connected to a database 240 including the TPRR 180 and the DR 185. Using for example the MSISDN=123456789 as lookup key the TC may access DR and determining that the present rule for the UE is <Rule 2> and the transmission pattern of the UE is <HDCAMSURV>. By accessing the TPRR the TC obtains that the <HDCAMSURV> pattern indicates a high definition surveillance camera having the characteristics Service=Video, Volume=500 KB per transmission, Frequency=Occasionally, Criticality=Maximum 5 transmission per day, Mobility=Fixed, QoS=High. The designation of Rule 2 may refer to e.g. the definition: Spatial=CellId456, Time=00:00-23:59, Service=Data, Volume=2 GB.

The TC is operationally connected to the NLP 172 enabling it to retrieve network load predictions. Depending on network considerations the load predictions can refer to the particular cell or area where the UE is located or may refer to the general load in the communication network. For example, in the cell where the UE is located the NLP may determine the predicted load level for data transmission as e.g. (time_00-06=LOW_TRAFFIC|time_06-18=HIGH_TRAFFIC|time_18-00=MID_TRAFFIC).

The TC is also operationally connected to the TCP 174 enabling it to retrieve transmission cost predictions. For example, using the MSISDN=123456789, the TCP may determine the cost predictions for data transmission for the particular subscriber. The transmission cost can be in monetary form e.g. (time_00-06=0.1$/MB|time_06-18=1.0$/MB|time_18-00=0.5$/MB or in relative form, e.g. (time_00-06=LOW|time_06-18=HIGH|time_18-00=MID).

The NLP is further operationally connected to the TCP for two way predictions retrieval. This is due to the fact that network operators often strives to even out traffic in the network by steering traffic towards low traffic hours using cost as the steering means. Thus, network load as obtained from the NLP may be used to determine cost levels by the TCP—and cost levels from the TCP may be used by the NLP to predict network load. Therefore, cost prediction as well as load prediction is an iterative process in that these factors are mutually affecting each other.

The TC 165 includes a Determination Unit DU 210 used to determine the rule to be applied by the device. A decision structure 220, for example a decision tree, is traversed using transmission impacting parameters such as transmission pattern, network load prediction and/or transmission cost prediction as modifiers in the structure in order to locate the relevant device transmission rule to be applied. In the example decision structure shown as a tree in FIG. 2, the transmission pattern identifier HDSURVCAM for MSISDN=123456789 will locate the relevant modifier for branching into subpart of a decision tree. As an example, provided present time is 03:00 the next lower modifier level the network load level being "LOW" is used to further branch into the further lower cost level modifier where the cost level being "LOW" finally determines that transmission rule "Rule 1" should be applied.

Figure 3:
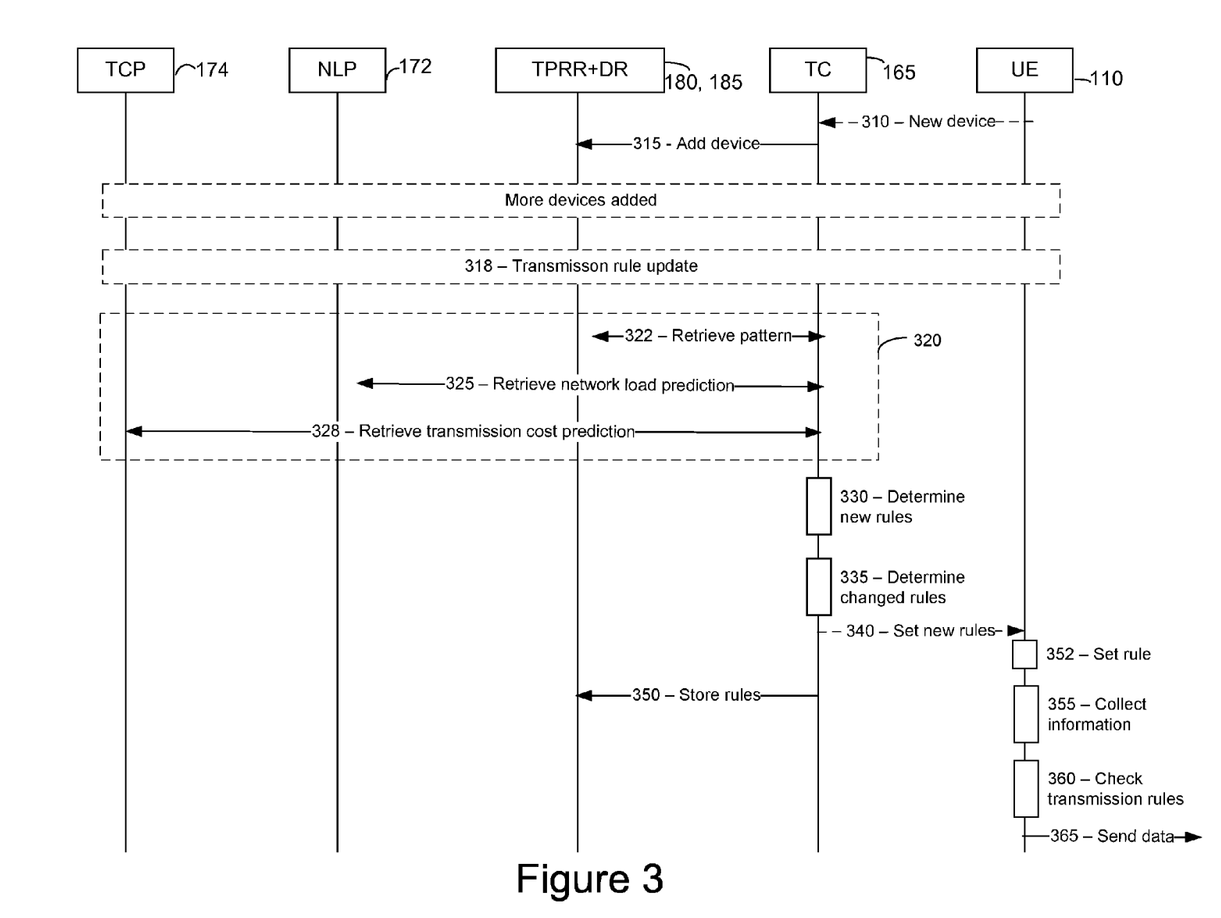
FIG. 3 is a message sequence chart showing a method for control of data transmission in a communication system.

FIG. 3 is a message sequence chart showing a method for control of data transmission in a communication system.

The method starts in when a new device is added to the network. The Transmission Control gets in step 310 a new device notification message for a new device received from a device or from another source such as a device management system. In the notification message the device informs the TC either about its device transmission pattern or about the type of device.

The new device notification message can be initiated manual e.g. when a new device is to be provisioned into the network it is provisioned also in the DR and TPRR. It can also be initiated automatic e.g. triggered by the device itself or by the device management system.

The TC updates the TPRR and DR with one or plural add device messages in step 315. In the case the new device message included a device transmission pattern for the device the DR is updated accordingly. In the case only a type of device can be identified from the new device notification message, a database (not shown) is accessed by the TC for looking up the pattern relevant for the device type. In case the new device notification message included a new device transmission pattern not already stored in the TPRR, TPRR is updated accordingly.

Step 310 and step 315 may occur for a plurality of devices. The new device initiation message and the add device message may also be batch messages performing the update for a plurality of devices.

In step 318 a device transmission rule update procedure is triggered. The procedure is triggered by from the TCP, NLP or at time intervals. The Transmission Controller determines if there is a need to update the current rules based on received:
 a. Triggers from Transmission Cost Predictor based on that the cost for data is e.g. high or low at the moment.
 b. Triggers from the Network Load Predictor based on e.g. that load due to usage in a certain location is either high or low at the moment.
 c. Triggers by set time intervals Once triggered, the device transmission rule update procedure starts in step 320 as further detailed by the sub steps 322, 325 and 328 by retrieving transmission impacting parameters. The TC retrieves the current transmission patterns and rules for a certain device, group of devices or type of devices from the TPRR and DR in step 322. In step 325 the Transmission Controller retrieves the current network load prediction. The current transmission cost prediction is retrieved by the Transmission Controller in step 328.

Once the Transmission Control has retrieved the transmission impacting parameters needed it evaluates the information and determines new rules in step 330.

In step 335 it is determined if the rules have changed for the device. If that is the case, the TC deploys the device with the new device transmission rule for transmission control by the device by sending a set new rule message in step 340 causing the rule to be set in step 352. The DR is also updated with the new rule for the device in step 350 by sending a store rules message.

Information data is collected by the device data transmitter of the device in step 355 and depending on device type and device logic the device will order a transmission of the information data to the server. In step 360 the data that is to be sent is analyzed according to the transmission rule check to check if it is possible to send the data in compliance with the device transmission rule. To do this, parameters such as time, geographical position and data volume is checked in accordance with the rule. In certain situations however, for example if the device is running out of storage or the information time is critical, device transmission rules may be overridden or the transmission rule check omitted due to the priority of such situation.

If it is decided that the data should be transmitted the device data transmitter that handles the actual transmission will receive the data for transmission and transmit the data in step 365.

Figure 4:
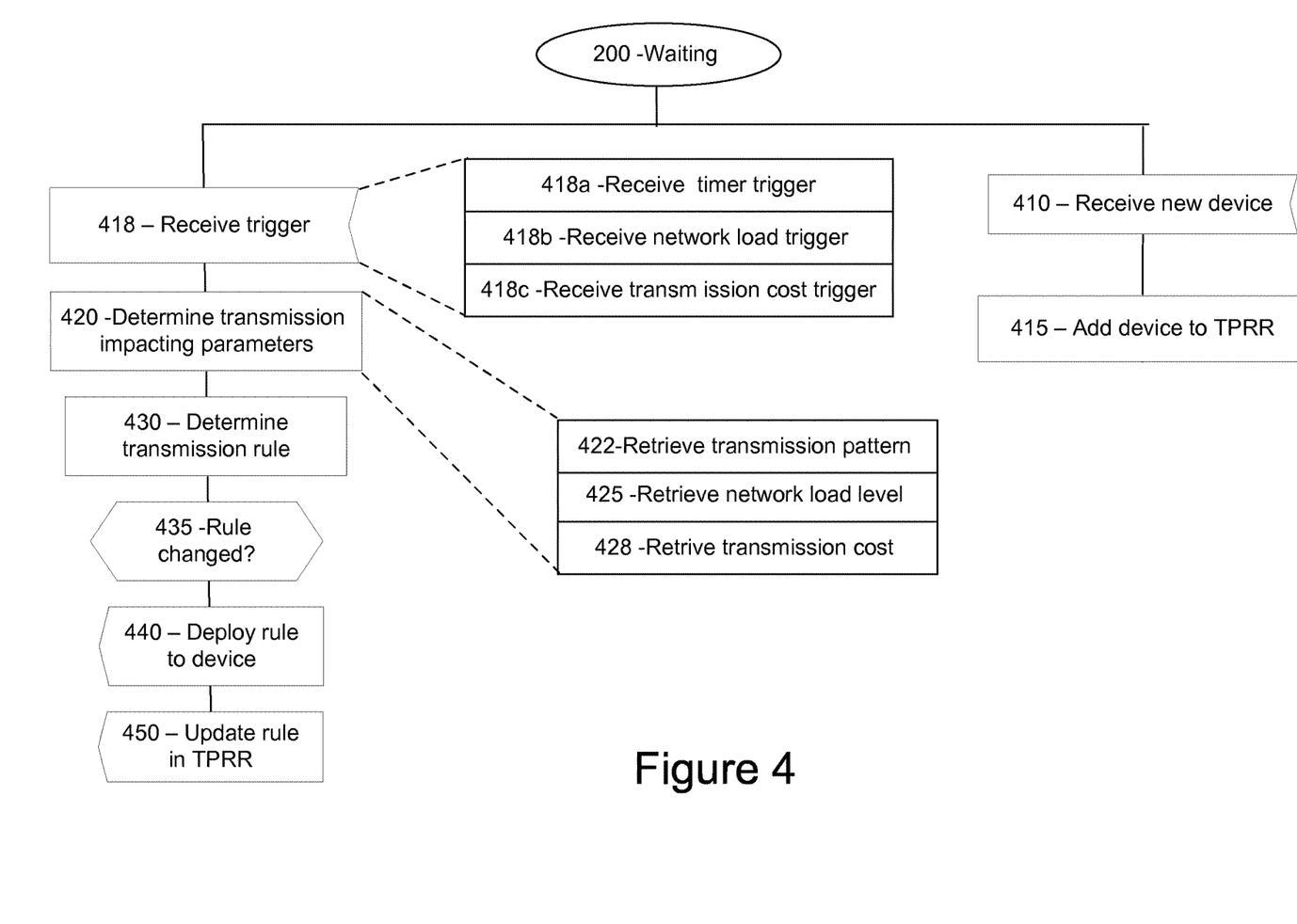
FIG. 4 is a flow chart showing a method for controlling data transmission in a transmission control node.

FIG. 4 is a flow chart showing a method for controlling data transmission in a transmission control node.

The method is executed by a transmission control node TCN for controlling data transmission, for example SMS, USSD, GPRS data etc. Initially the TCN is in a waiting state 200. The TCN leaves the waiting state in step 410 when it receives a new device notification message. In step 415 the device's transmission pattern is added to the DR and optionally the pattern is stored in the TPRR if not already existing, after which the TCN returns to the waiting state 200.

The TCN may also leave the waiting state 200 subsequent to receiving a request for a transmission rule for a device triggering a transmission rule update in a step 418 for example due to a determination that the transmission cost and/or the determined network load have reached a threshold value. Thus, the request for a transmission rule for a device may be any one of the sub types timer trigger 418*a* indicating a certain time interval has lapsed, a network load trigger 418*b* indicating network load in a certain location is high or low at the moment or a transmission cost trigger 418*c* indicating that cost for data transmission is high or low at the moment. E.g. for timer trigger, at certain intervals that could be preconfigured (or due to other triggers) the entity handling transmission control update the transmission rules at the device.

In step 420 one or several transmission impacting parameter are determined for the device based on information received in the request. The determination may be done by retrieving one or more of the current transmission patterns and/or rules for a certain device, group of devices or type of devices from the TPRR and DR in a sub step 422. The retrieval may be made by accessing a device type identifier included in the request and using the device type identifier to identify an associated device transmission pattern. The determination may also be made by accessing a device transmission pattern included in the request 410. If not already existing, the transmission pattern is added to the TPRR. The device transmission pattern may be described by any one of or a combination of service-, volume-, frequency-, criticality-, mobility- or quality of service-parameters. Alternatively or in addition, the TCN may retrieve the network load level as a present level or/and as a prediction from the NLP in a sub step 425. As a further alternatively or in addition, the transmission cost as a present level or/and as a prediction may be retrieved from the TCP in a sub step 428.

In step 430 a device transmission rule to govern the data transmission further based on the transmission impacting parameter or parameters is/are determined, e.g. based on the devise transmission patterns, network load prediction and a transmission cost prediction.

The transmission rule may be characterized by any or a combination of spatial-, time-, service-, volume-, duration-, and cost-parameters.

A determination is made in step 435 determining whether the determined device transmission rule differs from a presently deployed rule such that the device rule needs to be changed. Upon positive determination a transmission rule deployment message is transmitted to the device in step 440 enabling the device to govern transmission in accordance with the transmission rule. The deployment message may include the complete rule or it may send an identifier to a rule already accessible by the device.

In addition to deploying the device rule to the device, the rule may also be transmitted to the DR in step 250 for keeping track in the TCN of the present rules deployed in the device.

Figure 5:
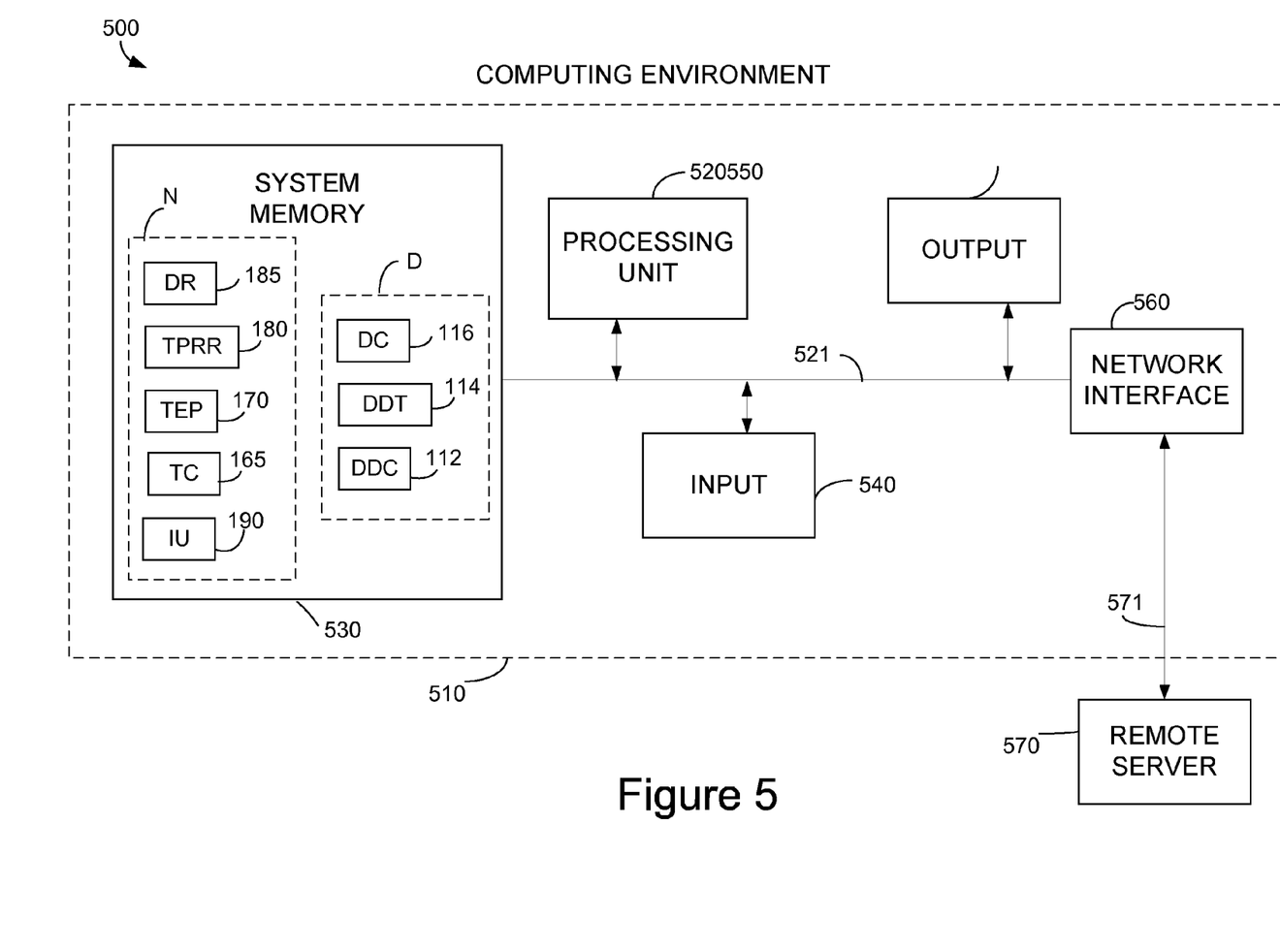
FIG. 5 is a block diagram showing an exemplary computing device for implementing a system for controlling data transmission in a communication system, or a user equipment device.

FIG. 5 is a block diagram showing exemplary embodiments of a Transmission Control Node apparatus TCN for controlling data transmission in a communication system in the form of computing system environment 500, and a user equipment device. As would be obvious to skilled person, the computing computing system environment 500 represents a general platform that may be instantiated to serve various functions. Thus, in FIG. 5 the function block relating to a TCN is referenced with "N" while for a user equipment device the related function block may instead be those referenced as "D".

Although as made clear above, the computing system environment 500 is only one example of a suitable computing environment for a TCN or a user equipment device and is not intended to suggest any limitation as to the scope of use or functionality of the claimed subject matter. Further, the computing environment 500 is not intended to suggest any dependency or requirement relating to the claimed subject matter and any one or combination of components illustrated in the example operating environment 500.

An example of a device for implementing the previously described innovation includes a general purpose computing device in the form of a computer 510. Components of computer 510 can include, but are not limited to, a processing unit 520, a system memory 530, and a system bus 521 that couples various system components including the system memory to the processing unit 520. The system bus 521 can be any of several types of bus structures including a memory bus or memory controller, a peripheral bus, and a local bus using any of a variety of bus architectures.

Computer 510 can include a variety of computer readable media. Computer readable media can be any available media that can be accessed by computer 510. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media can embody computer readable instructions, data structures, program modules or other data in a modulated data signal such as a carrier wave or other transport mechanism and can include any suitable information delivery media.

The system memory 530 can include computer storage media in the form of volatile and/or nonvolatile memory such as read only memory (ROM) and/or random access memory (RAM). A basic input/output system (BIOS), containing the basic routines that help to transfer information between elements within computer 510, such as during start-up, can be stored in memory 530. Memory 530 can also contain data and/or program modules that are immediately accessible to and/or presently being operated on by processing unit 520. By way of non-limiting example, memory 530 can also include an operating system, application programs, other program modules, and program data.

In some embodiments at least one of the TC 165, TEP 170, TPRR 180, DR 185 and IU 190 function blocks may be implemented as software modules loaded into the memory 530 and processable by the processing unit 520. In such embodiments the memory is storing instructions that, when executed by the processor, cause the apparatus to receive a request for a transmission rule for a device and to determine a transmission impacting parameter for the device based on information received in the request. Based on the determined transmission impacting parameter the memory further comprises instruction that when executed by the processor cause the apparatus to determine a device transmission rule governing the data transmission by the device and to transmit a transmission rule deployment message to the device enabling the device to govern transmission in accordance with the device transmission rule.

The computer 510 can also include other removable/non-removable and volatile/nonvolatile computer storage media. For example, computer 510 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 521 through a non-removable memory interface such as an interface, and a magnetic disk drive or optical disk drive can be connected to the system bus 521 by a removable memory interface, such as an interface.

A user can enter commands and information into the computer 510 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 520 through user input 540 and associated interface(s) that are coupled to the system bus 521, but can be connected by other interface and bus structures, such as a parallel port, game port or a universal serial bus (USB).

A graphics subsystem can also be connected to the system bus 521. In addition, a monitor or other type of display device can be connected to the system bus 521 through an interface, such as output interface 550, which can in turn communicate with video memory. In addition to a monitor, computers can also include other peripheral output devices, such as speakers and/or printing devices, which can also be connected through output interface 550.

The computer 510 can operate in a networked or distributed environment using logical connections to one or more other remote computers, such as remote server 570, which can in turn have media capabilities different from device 510. The remote server 570 can be a personal computer, a server, a router, a network PC, a peer device or other common network node, and/or any other remote media consumption or transmission device, and can include any or all of the elements described above relative to the computer 510. The logical connections depicted in FIG. 5 include a network 571, such as a local area network (LAN) or a wide area network (WAN), but can also include other networks/buses.

When used in a LAN networking environment, the computer 510 is connected to the LAN 571 through a network interface or adapter. When used in a WAN networking environment, the computer 510 can include a communications component, such as a modem, or other means for establishing communications over a WAN, such as the Internet. A communications component, such as a modem, which can be internal or external, can be connected to the system bus 521 through the user input interface at input 540 and/or other appropriate mechanism.

In a networked environment, program modules depicted relative to the computer 510, or portions thereof, can be stored in a remote memory storage device. It should be noted that the network connections shown and described are exemplary and other means of establishing a communications link between the computers can be used.

Additionally, it should be noted that as used in this application, terms such as "component," "display," "interface," and other similar terms are intended to refer to a computing device, either hardware, a combination of hardware and software, software, or software in execution as applied to a computing device. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

As with the TCN, a computing system such as the computing system 500 described in FIG. 5 may, as have been described in the foregoing, also be adapted to perform the functions of a user equipment device. In such embodiment the function blocks DCC 112, DDT 114 and DC 116 are software modules loaded into the memory and processable by the processing unit adapting the user equipment device to receive a transmission rule deployment message to set a device transmission rule at the user equipment device, to collect data to be transmitted and to check the data for compliance with the device transmission rule. If affirmative the device transmits the data to a server via a connectivity access network.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method performed by a data transmission control node in a communication system, comprising the steps of:
   receiving a request for a transmission rule for a device;
   determining a transmission impacting parameter for the device based on information received in the request;
   based on the transmission impacting parameter further determining a device transmission rule governing data transmission by the device; and
   transmitting a transmission rule deployment message to the device, enabling the device to govern data transmission in accordance with the device transmission rule;
   wherein, before the step of transmitting the transmission rule deployment message, the method includes determining whether the determined device transmission rule differs from a presently deployed device transmission rule and transmitting the transmission rule deployment message only upon a positive determination.

2. The method according to claim 1, wherein the step of determining the transmission impacting parameter includes the further step of determining a device transmission pattern.

3. The method according to claim 2, wherein the further step of determining the device transmission pattern comprises:
   accessing a device type identifier included in the request; and
   using the device type identifier to identify an associated device transmission pattern.

4. The method according to claim 2, wherein the step of determining the device transmission pattern comprises accessing a device transmission pattern included in the request.

5. The method according to claim 4, further comprising adding the device transmission pattern to a device transmission pattern repository.

6. The method according to claim 2, wherein the device transmission pattern is defined by any one of or a combination of service-, volume-, frequency-, criticality-, mobility- or quality-of-service-parameters.

7. The method according to claim 1, wherein the step of determining the transmission impacting parameter is based on determining a communication network load level.

8. The method according to claim 1, wherein the step of determining the transmission impacting parameter is based on determining a communication network transmission cost.

9. The method according to claim 1, wherein the step of determining the device transmission rule and the step of transmitting the transmission rule deployment message are initiated by the transmission control node upon determining that at least one of a transmission cost and a network load has reached a corresponding threshold value.

10. The method according to claim 1, wherein the step of determining the device transmission rule and the step of transmitting the transmission rule deployment message are repeated at predetermined intervals.

11. The method according to claim 1, further comprising, upon the positive determination, transmitting the transmission rule deployment message to a transmission pattern repository.

12. The method according to claim 1, wherein the device transmission rule is comprised by any or a combination of spatial-, time-, service-, volume-, duration-, and cost-parameters.

13. The method according to claim 1, wherein the transmission rule deployment message comprises the data transmission rule or an identifier of the data transmission rule.

14. A transmission control node apparatus comprising a processor, and a memory storing instructions that, when executed by the processor, configure the apparatus to:
   determine a transmission impacting parameter for a device based on information received in a request for a transmission rule for the device;
   determine a device transmission rule governing data transmission by said device, based on the determined transmission impacting parameter; and
   transmit a transmission rule deployment message to the device, thereby enabling the device to govern data transmission in accordance with the device transmission rule;
   wherein, before transmitting the transmission rule deployment message, the apparatus is configured to determine whether the determined device transmission rule differs from a presently deployed device transmission rule and transmit the transmission rule deployment message only upon a positive determination.

15. The transmission control node apparatus according to claim 14, wherein the determination of the transmission impacting parameter is based on a determination of a device transmission pattern.

16. The transmission control node apparatus according to claim 14, wherein the transmission rule deployment message comprises the device transmission rule or an identifier of the device transmission rule.

* * * * *